July 2, 1935.    H. H. ROBINSON    2,006,409
PNEUMATIC SUPPORT FOR VEHICLE FRAMES AND THE LIKE
Filed Sept. 11, 1933
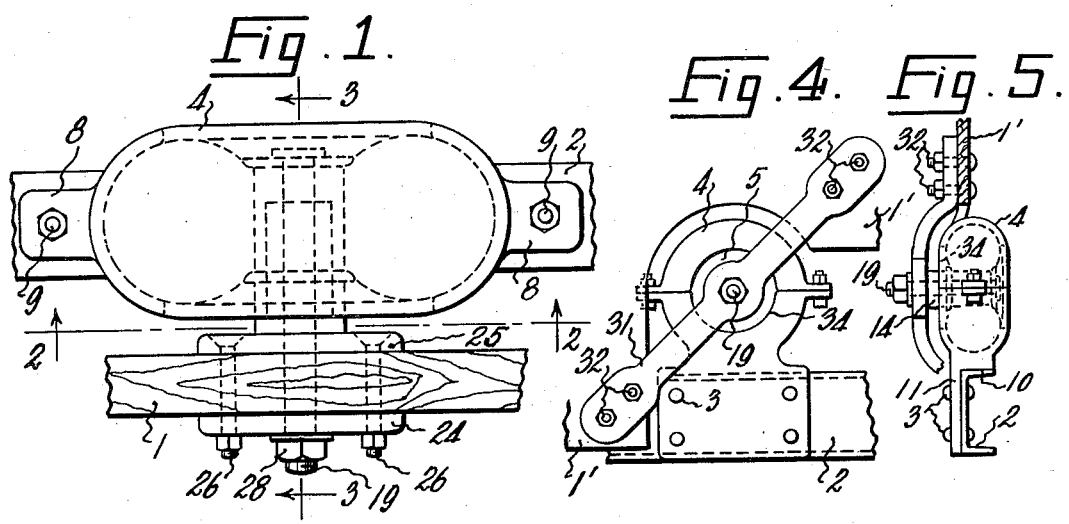
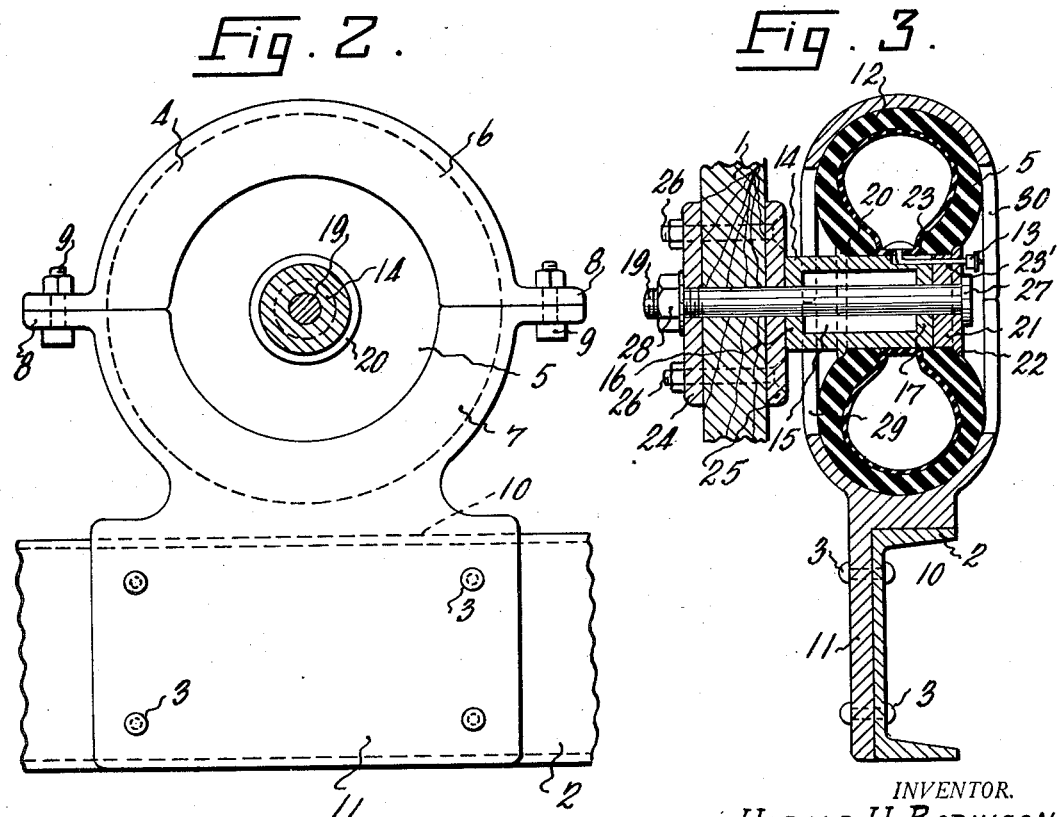
INVENTOR.
HAROLD H. ROBINSON
BY Chapin & Neal
ATTORNEYS.

Patented July 2, 1935

2,006,409

UNITED STATES PATENT OFFICE 2,006,409

PNEUMATIC SUPPORT FOR VEHICLE FRAMES AND THE LIKE

Harold H. Robinson, Coral Gables, Fla., assignor to Curtiss Aerocar Company, Inc., Coral Gables, Fla., a corporation of Florida Application September 11, 1933, Serial No. 688,910

1 Claim. (Cl. 296—35)

This invention relates to pneumatic means for connecting members, such as the chassis and body frame of a vehicle, together, to permit a degree of cushioned relative movement between the members.

One object of the invention is to provide a hanger adapted for the resilient support of vehicle bodies.

Another object is to provide a body supporting hanger which will prevent the transmission of shocks from the chains to the body.

Other and further objects reside in the details of the construction and manner of assembly of the parts as will be apparent from the following specification and claim.

In the accompanying drawing which illustrates one embodiment of the invention:

Fig. 1 is a plan view of the device;

Fig. 2 is a side view of the structure shown in Fig. 1;

Fig. 3 is a sectional view substantially on line 3—3 of Fig. 1;

Fig. 4 is a side elevation showing a modified form of the device shown in Fig. 1; and Fig. 5 is an end view of the structure shown in Fig. 4.

Referring to Figs. 1, 2 and 3, 1 designates a horizontal member of a vehicle body frame or the like and 2 designates a horizontal frame member of a chassis upon which the body frame is to be supported. As shown, the member 1 is in the form of a wooden beam while member 2 is in the form of a channel iron. Attached to chassis frame member 2 is an annular metal housing 4 shaped on its inner surface to conform to the periphery of a pneumatic tire 5. The housing is divided horizontally to form upper and lower halves designated 6 and 7 respectively and the halves are provided with mating lugs 8 drilled to receive bolts 9 which hold the housing clamped tightly and nonrotatably about the tire 5 while permitting insertion or removal of the tire as desired. The lower half 7 is provided with an elongated flat surface 10 adapted to rest, as shown in Fig. 3, upon the frame member 2, and is also provided with a flange 11 engaging the side of member 2 and riveted or otherwise secured thereto as at 3.

The tire 5 which may be of any suitable design and construction, encloses the usual inner tube 12 which is provided with a valve 13 through which the tube may be inflated. The tire 5 is mounted on a two part hub 14, one member of which comprises a hollow cylindrical member 15 having closed ends 16 and 17 based axially for the reception of a clamping bolt 19, and provided with a flange 20 adapted to take the horizontal thrust of one bead of the tire. The second member of hub 14 comprises a cap member 21 (bored to receive bolt 19) and provided with a flange 22, which engages the other bead of the tire. Member 15 is grooved at 23 to accommodate the stem of valve 13 and cap member 21 is drilled as at 23' to permit the extension of the valve stem to the outside of the cap for convenience in inflating the tire. Bearing plates 24 and 25 apertured to receive bolt 19 are secured to opposite sides of frame member 1 by bolts 26. Bolt 19 is provided at one end with a head 27, engaging cap member 21 and is threaded at the other to receive nut 28 by which hub 14 is clamped tightly to frame member 1.

In the assembling of the foregoing elements, tire 5 and tube 12 are assembled in the usual manner and hub member 15 is inserted in the center of the tire annulus with channel 23 in alignment with valve stem 13. Cap member 21 is similarly inserted from the opposite side with the valve stem passing through opening 23'. The top half 6 of housing 4 being removed, the tire is placed in the lower half 7 of the housing and the upper half 6 is then bolted in place. Clamping bolt 19 is inserted through hub 14 and plates 24 and 25 and the hub drawn into rigid abutment with plate 25 by tightening nut 28 on bolt 19, flanges 20 and 22 at the same time being drawn into position against the tire beads to hold the tire against axial displacement. The tire is then inflated through valve 13 in the usual manner. The openings 29 and 30 at the sides of the housing 4 serve the dual purpose of giving access to the hub parts and providing room for a degree of expansion of the tire 5 under varying loads.

In Fig. 5 is shown a modified form of assembly by which the car body, the tire and the chain member are placed in substantially vertical alignment. As there shown the chassis member 2, housing 4, tire 5 and hub 14 are assembled as previously described. The car body 1' is cut away as at 31 to receive the housing 4. The opening 34 is bridged by an angularly positioned yoke 31 secured at its ends to body 1' by bolts 32. The yoke 31 is bored at its center to receive bolt 19 to secure hub 14 and the parts carried thereby to the yoke. As is clearly shown in Fig. 5 yoke 31 is offset sufficiently to bring housing 4 and chassis member 2 substantially in vertical alignment with the body 1'.

It will be seen that in the construction above described the body load is transmitted to the chassis through the tire 5 and conversely all road and operating shocks imparted to the chains are cushioned or absorbed by the tire 5, thus protecting the body from such shocks.

It will further be seen that the degree of cushioning effect of the device may be varied by varying the pressure in the tire 5 to accommodate varying road conditions and loads.

The use of a pneumatic tire including a casing and inner tube affords a very rugged structure and has the further advantage that the rubber and fabric of the tire casing acts as an intermediate cushion between the housing 4 and the air cushion in the tube absorbing minor vibrations.

I claim:

A device for connecting a body to a chassis which comprises, an annular housing having a transversely arcuate face on its inner periphery and adapted to be secured in a vertical position on a horizontal member of the chassis frame, a pneumatic tire, including a casing and an inner tube, positioned within said housing and held in non-rotatable relation thereto by engagement of the tread portion of the tire with the inner peripheral surface of the housing, a hub upon which said tire is mounted, said hub being divided transversely into two parts, a flange formed on each hub part adapted to engage the bead portions of the tire casing, and a bolt passing axially through said hub to hold said hub parts in position to tightly grip the beads of the tire casing between the flanges and to connect the hub rigidly to the body.

HAROLD H. ROBINSON.